Oct. 31, 1933.  S. L. HIRST  1,933,014
SAND AND SCALE TRAP
Filed Sept. 2, 1930  2 Sheets-Sheet 2
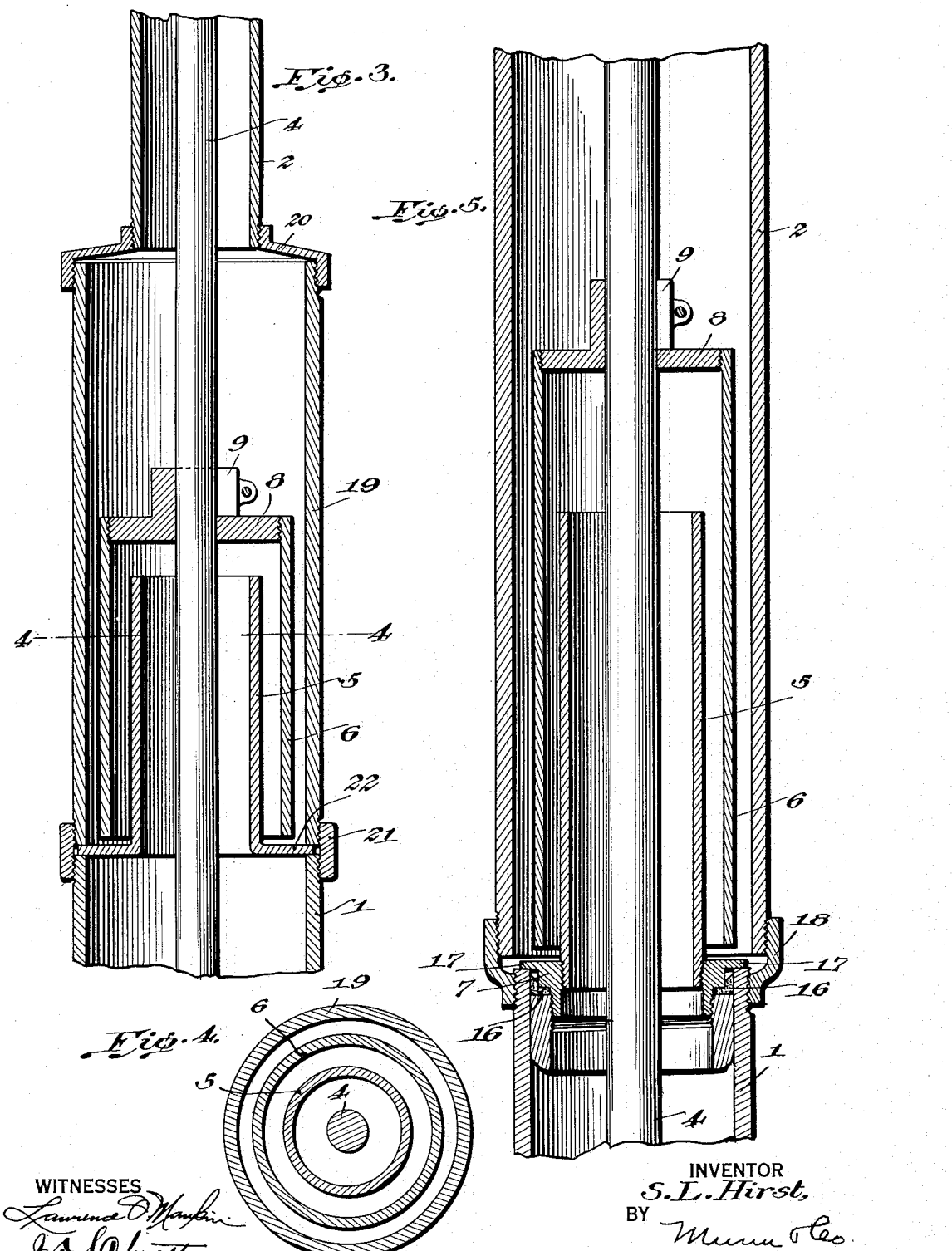

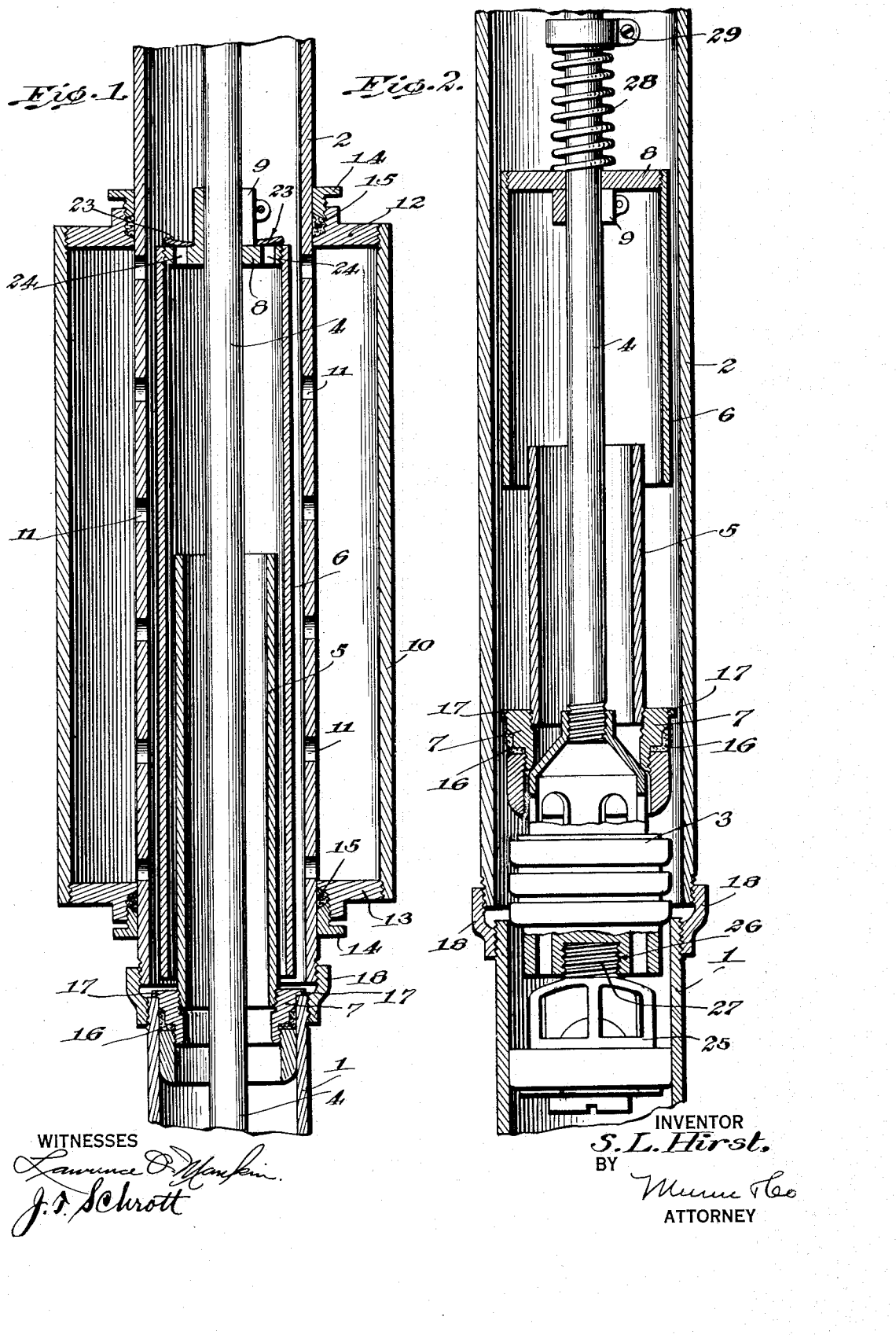

Patented Oct. 31, 1933

1,933,014

UNITED STATES PATENT OFFICE 1,933,014

SAND AND SCALE TRAP

Samuel L. Hirst, Beeville, Tex.

Application September 2, 1930. Serial No. 479,298

5 Claims. (Cl. 103—220)

This invention relates to improvements in pumps, but more especially in sand and scale traps adapted for use in combination with plunger pumps, and it consists of the constructions, combinations and arrangements herein described and claimed.

An object of the invention is to provide a trap to be used in conjunction with a pump of the foregoing type, so arranged as to catch rust, scales, sand, etc. when the pump is idle thus avoiding the accumulation of this debris around the plunger to the detriment of the cup leathers of the latter when the operation is again started.

Another object of the invention is to provide a trap which is self-cleaning, the principle being such that the water is made to course through the trap and thus carry aloft any sediment accumulated while the pump was idle.

A further object of the invention is to provide means to insure the washing out of sand from an entrapping structure in the fluid conduit on every down stroke of the plunger rod, said means comprising an inverted cup-shaped tubular section which goes down into the entrapping structure on the down strokes of the rod and by virtue of them progressively reducing the available size of the fluid passageway makes up for the diminishing flow of fluid and so maintains a substantially uniform washing out force.

Other objects and advantages will appear in the following specification, reference being had to the accompanying drawings in which Figure 1 is a vertical section of the trap and all of its accessories, the plunger rod being shown in elevation.

Figure 2 is a similar view of a simplified form of the invention, illustrating a modification and also the mode of extracting the trap.

Figure 3 is a vertical section illustrating the adaptation of the trap to a pump having a small-size tubing.

Figure 4 is a cross section taken on the line 4—4 of Figure 3.

Figure 5 is a vertical section showing the use of the trap in conjunction with a larger-size tubing.

It requires but a brief preparatory statement to define as one of the main difficulties in plunger pump operation the accumulation of rust, scales, sand, etc. around the plunger when the pump is idle. This debris works in around the cup leathers and engenders excessive friction when the pump is started, not only to the ultimate destruction of the cup leathers but to the detriment of the working barrel as well.

The trap is intended to be placed above the working barrel 1, in fact between the working barrel 1 and the tubing 2 above it. A valve or plunger 3 (partially shown in section in Fig. 2) is reciprocated in the barrel 1 by a rod 4 which extends to the windmill or other mechanism used for its operation.

Several forms of the trap are herein disclosed, but in all instances the principle is identical. Refer first to Figure 1. The trap comprises a lower tubular section 5 and an upper tubular section 6. One of these sections is movable in respect to the other, however, always maintaining the telescopic, concentric relationship shown.

For this purpose the lower section 5 is rendered stationary by virtue of the engagement of its carrying means 7 with the working barrel 1, while the upper section 6 is rendered movable by virtue of the connection of its head 8 with the rod 4 by means of an appropriate clamp 9. The carrying means 7 establishes an annular closure between the lower tubular section 5 and the working barrel 1 thus defining a settling chamber in which accumulations of rust, scales, sand, etc. may collect when the pump is idle.

As the rod 4 reciprocates during the operation of the pump the water elevated in the barrel 1 flows through the tortuous passage between the lower section 5 and the tubing 2, and in doing so washes out the foregoing accumulation from the settling chamber. Where this occurs at the beginning of operation of the pump, the washing act is a continuous performance in the subsequent operation, thus making the trap self-cleaning.

The form of trap in Figure 1 is especially adapted to wells that are known to pump a large amount of sand and rather than to confine the sand to the settling chamber consisting of section 5, carrying means 7 and tubing 2 the latter is fitted with a rather large cylinder 10 to which access is had by way of holes 11 in that length of the tubing 2 between the upper and lower heads 12 and 13 of the cylinder.

These heads are supplied with glands 14 which operate against packings 15 to produce a water-tight joint around the tubing 2 in zones beyond the holes 11.

The cylinder 10 is nothing more than an extension settling chamber. It is in communication with the original settling chamber through the holes 11. When the former tends to fill, the surplus debris will flow through the holes 11 and settle in the cylinder 10. The term "settling chamber" is thus to be construed in a collective sense.

In reference to the carrying means 7 it is to be observed that this comprises several couplings into one of which the section 5 is screwed or otherwise secured. The couplings have one or more cup leathers or other packings 16 between them, mainly for the purpose of holding the carrying means with sufficient friction to prevent its displacement during the operation of the pump. The insertion of the carrying means is limited by a flange 17 on one of the couplings, this being rested upon the upper edge of the barrel 1. This barrel and the tubing 2 are connected by a pipe joint 18, and it is within this that the seating of the flange 17 occurs.

Reference is now made to Figure 3. Here the telescoping lower and upper sections 5 and 6 of the trap bear practically the same relationship to each other as they do in Figure 1. Figure 1 represents part of a long-stroke pump while Figure 3 represents a short-stroke pump. Here the tubing 2 is small in size, as it would be in a shallow well pump, and in order to accommodate the trap a cylinder 19 is used for the purpose of enlargement of the tubing 2. This cylinder is connected with the tubing 2 by means of a head 20 and is coupled with the working barrel 1 by means of a pipe joint 21. The cylinder 19 is thus a virtual extension of the tubing 2, and as far as its relationship to the trap is concerned the cylinder 19 is to be regarded as part of the tubing 2 inasmuch as the tubing defines one wall of the settling chamber. The carrying means of the tubular section 5 now comprises an annular flange 22, the rim of which is clamped between the edges of the barrel 1 and the cylinder 19.

It is to be observed that the carrying means 22 composes the bottom of the settling chamber in this form as does the carrying means 7 in the form in Figure 1. Although the cylinder 19 does not compose an extension settling chamber, it is nevertheless, part of the settling chamber as is obvious without further explanation.

The form in Figure 5 is to be identified as part of a deep well pump. Here the tubing 2 is larger than the working barrel 1. The trap, comprising the lower and upper sections 5, 6, is mounted identically with Figure 1. The carrying means 7 supports the lower section 5 upon the barrel 1 in the same manner as does the carrying means 7 support the section 5 in Figure 1. The extension chamber 10 of Figure 1, and any equivalent is omitted in Figure 5. The tubing 2 is imperforate and defines the outer boundary of the settling chamber.

Figure 2 is intended to illustrate the mode of extracting the trap from the pump. This mode can be carried out only with the types in Figures 1 and 5. Upon raising the plunger rod 4 the sections 5, 6 separate until the plunger engages one of the couplings of the carrying means 7. A continued pull forces a separation of the packing 16 from the working barrel 1 so that the entire trap can be carried to the top.

The arrangement in Figure 2 embodies a modification that makes it possible to pick up the standing valve 25 regardless of the presence of the trap in the barrel 1. The plunger 3 has a threaded hole 26 into which the correspondingly threaded stem 27 of the standing valve is screwed when it is desired to pick up the standing valve for removal from the barrel.

In ordinarily assembling the pump the standing valve 25 is lowered to a seating position near the bottom of the working barrel 1. This is common practice. The plunger 3 is customarily provided with the threaded hole 26. It is also the practice to lower the plunger 3 sufficiently far beyond the bottom extremity of its stroke to screw the plunger 3 and standing valve 5 together when desiring to remove the latter.

Since the combination of the trap with the rod 4 in the other forms of the invention would prevent this additional lowering of the plunger 3 the clamp 9 is now made separate from the head 8, thus merely to serve as an abutment for the head to limit the expansion of a spring 28. The upper end of the spring rests against a collar 29 secured to the rod 4.

The spring 28 is sufficiently stiff to maintain the head 8 tightly against the clamp 9 without yielding in the ordinary operation. Should it be desired to remove the standing valve 25 the operator has only to bear down on the rod 4 whereupon the plunger 3 will be extended sufficiently far to reach the stem 27. The section 6 would be stopped by the flange 17, but the spring 28 would yield to let the rod 4 slide through.

Briefly reverting to Figure 1 it is noted that the head 8 carries a flap valve 23 which works in conjunction with holes 24. The use of the flap valve and the provision of the holes is optional because the device will work without them. However, in rapidly working well pumps the relief which would be afforded by the valve 23 and holes 24 would make it possible for the rod 4 to move down more rapidly. The flap valve 23 is the only valve used in conjunction with the trap, but as far as the operation and utility of the trap are concerned this valve is non-essential.

The operation is readily understood. Since the upper tubular section 6 is secured to the plunger rod 4, although yieldably as in the instance of Figure 2, and the lower tubular section 5 is rendered stationary by virtue of its mounting upon the working barrel 1 it follows that there will be relative movement of one section to the other during the reciprocation of the rod 4. The passage of water or oil (should the trap be used in conjunction with oil wells) through the passage between the sections 5, 6 washes out all debris finding its way into the settling chamber which is composed of the section 5, its carrying means 7, 22 and the tubing 2 (Fig. 1 or cylinder 19, Fig. 3).

The tubular section 6 is so clamped at 9 on the rod 4 that its lower edge will come quite close to the carrying means 7, 22 when the sections 5, 6 assume the extreme telescoping position. The lower edge of the section 6 thus tends to pulverize any heavy scales or the like and makes it possible to wash out all of the debris.

Another important purpose attaches to the foregoing lower edge of the section 6. This section travels up and down with the plunger rod 4, and when the plunger rod makes its down strokes the force of fluid through the conduit, represented by the working barrel 1, lower tubular section 5 and tubing 2, is at its lowest ebb.

As the section 6 advances into the entrapping structure, said structure again involving the section 5 and tubing 2 and including the carrying means 7, the available passageway between the lower edge of the section 6 and the carrying means 7 will be progressively decreased. Bearing in mind that the fluid is flowing through with diminishing velocity as the rod 4 goes down, the foregoing decrease in size of the passageway produces an increase in velocity past the lower edge of the section 6 so that insofar as the washing out function is concerned the washing force remains substantially the same.

It has been explained that the modified arrangement in Figure 2 is intended to enable the removal of the standing valve 25 regardless of the presence of the trap which would otherwise offer an obstruction. The standing valve is shown as having been caught by the plunger 3. Of course in practice the parts 3 and 25 would be separate, the standing valve assuming a fixed position at the bottom of the working barrel. The spring 28 enables yielding of the rod 4 when pressed down upon, so that the plunger 3 can be made to reach the stem 27.

Although this arrangement is described as a modification it is not at all peculiar to the particular construction in Figure 2. The clamp 9 can be made separate in any form of the invention and the rods 4 provided with springs 28 and collars 29 so that additional relative movement of the rod to the trap can be had for the purpose of picking up the standing valve.

With the exception of the flap valve 23 (Fig. 1), the use of which has already been stated as being optional, the trap is entirely without valves. There is no possibility of the occurrence of trouble from this source. One of the advantages of the trap is that very little additional duty is imposed on the pump, and when this circumstance is viewed from the standpoint of prolongation of the life of the plunger the slightly additional power required is well worth the expenditure.

While the construction and arrangement of the improved sand and scale trap is that of a generally preferred form, obviously modifications and changes may be made without departing from the spirit of the invention or the scope of the claims.

I claim:—

1. A trap for pumps comprising a pair of tubular sections in spaced, telescopic relationship, carrying means by which one of the sections is stationarily mounted upon the working barrel of the pump to define part of a settling chamber, means at the remote end of the other section for attaching it to the plunger rod to move therewith, a cylinder constituting an extension of said settling chamber, and a tubing attached to the working barrel, comprising part of the pump and having said sections and the extension cylinder on the respective in and out sides thereof, that portion of the tubing within the cylinder being perforated for communication of the settling chamber with said cylinder.

2. A pump having a working barrel, a standing valve, a plunger and rod, means on the respective plunger and standing valve for making a connection; in combination, means including parts working in conjunction with said working barrel and rod to provide a debris settling chamber, and means embodied in said last means providing a slip connection between the respective part of said first means and said rod enabling an extension of the rod with reference to said respective part beyond its normal stroke to enable coupling the plunger with said standing valve through said connecting means for the withdrawal of said standing valve.

3. A trap comprising a pair of tubular sections in spaced, telescopic relationship, carrying means by which one of the sections is stationarily mounted in respect to the working barrel of a pump to define part of a settling chamber, and means for yieldably mounting the other section to a plunger rod.

4. A trap comprising a pair of tubular sections in spaced, telescopic relationship, carrying means by which one of the sections is stationarily mounted in respect to the working barrel of a pump to define part of a settling chamber, spaced abutments carried by the pump rod between which abutments the other section is movably mounted on said rod, and resilient means acting against one of the abutments and said other section to yieldably hold said other section against the other abutment.

5. A trap for pumps comprising a fluid conduit for the conduction of the entire flow of fluid, a plunger rod working axially with respect to said conduit and having a plunger for raising the fluid in said conduit, a carrying means fixed in the conduit having an opening providing ample room around the rod for the flow of said fluid, a tubular section upstanding from said carrying means, comprising a part of the conduit, and an inverted cup-shaped tubular structure into which said fluid flow occurs and compelling the fluid to flow over the upper edge of said tubular section, said inverted structure being affixed to the rod and substantially enclosing said tubular section, the fluid entrapped in said tubular structure being compelled to flow past the lower edge thereof and continuously wash out sand tending to settle on said carrying means.

SAMUEL L. HIRST.